(12) United States Patent
Rokicki et al.

(10) Patent No.: US 8,125,215 B2
(45) Date of Patent: Feb. 28, 2012

(54) MEASURING VIBRATIONS OF A TURBO-MACHINE ROTOR BLADE WITH THE HELP OF AN INDUCTION SENSOR IN HIGH TEMPERATURE

(75) Inventors: Edward Rokicki, Oksa (PL); Jaroslaw Spychala, Warsaw (PL); Ryszard Szczepanik, Warsaw (PL); Pawel Majewski, Warsaw (PL)

(73) Assignee: Instytut Techniczny Wojsk Lotniczych, Warsaw (PL)

( * ) Notice: Subject to any disclaimer, the term of this patent is extended or adjusted under 35 U.S.C. 154(b) by 373 days.

(21) Appl. No.: 12/477,472

(22) Filed: Jun. 3, 2009

(65) Prior Publication Data

US 2010/0045273 A1    Feb. 25, 2010

(30) Foreign Application Priority Data

Jun. 9, 2008    (PL) .......................................... 385627

(51) Int. Cl.
*G01B 7/14*    (2006.01)

(52) U.S. Cl. ................................................. 324/207.15

(58) Field of Classification Search ............. 324/207.15, 324/239, 240
See application file for complete search history.

(56) References Cited

U.S. PATENT DOCUMENTS

| 6,661,222 B1* | 12/2003 | Twerdochlib ............ 324/207.26 |
| 7,023,205 B1* | 4/2006 | Krupp ............................ 324/239 |
| 2006/0122798 A1* | 6/2006 | Teolis et al. ..................... 702/66 |

OTHER PUBLICATIONS

Curie Table, Thornton, Steven T. and Rex, Andrew, Modern Physics for Scientists and Engineers, Saunders College Publishing, 1993. Chapter 11.*

* cited by examiner

*Primary Examiner* — Huy Q Phan
*Assistant Examiner* — Temilade S Rhodes-Vivour
(74) *Attorney, Agent, or Firm* — Westman, Champlin & Kelly, P.A.; Zbigniew P. Sawicki

(57) ABSTRACT

A method is disclosed of measuring vibrations on turbo-machine rotary turbine blades utilizing an induction sensor at high temperatures. A set of magnets produces a magnetic field which results in a measurement signal generated in the sensor's coil which then can be interpreted to measure the vibrations.

4 Claims, 1 Drawing Sheet

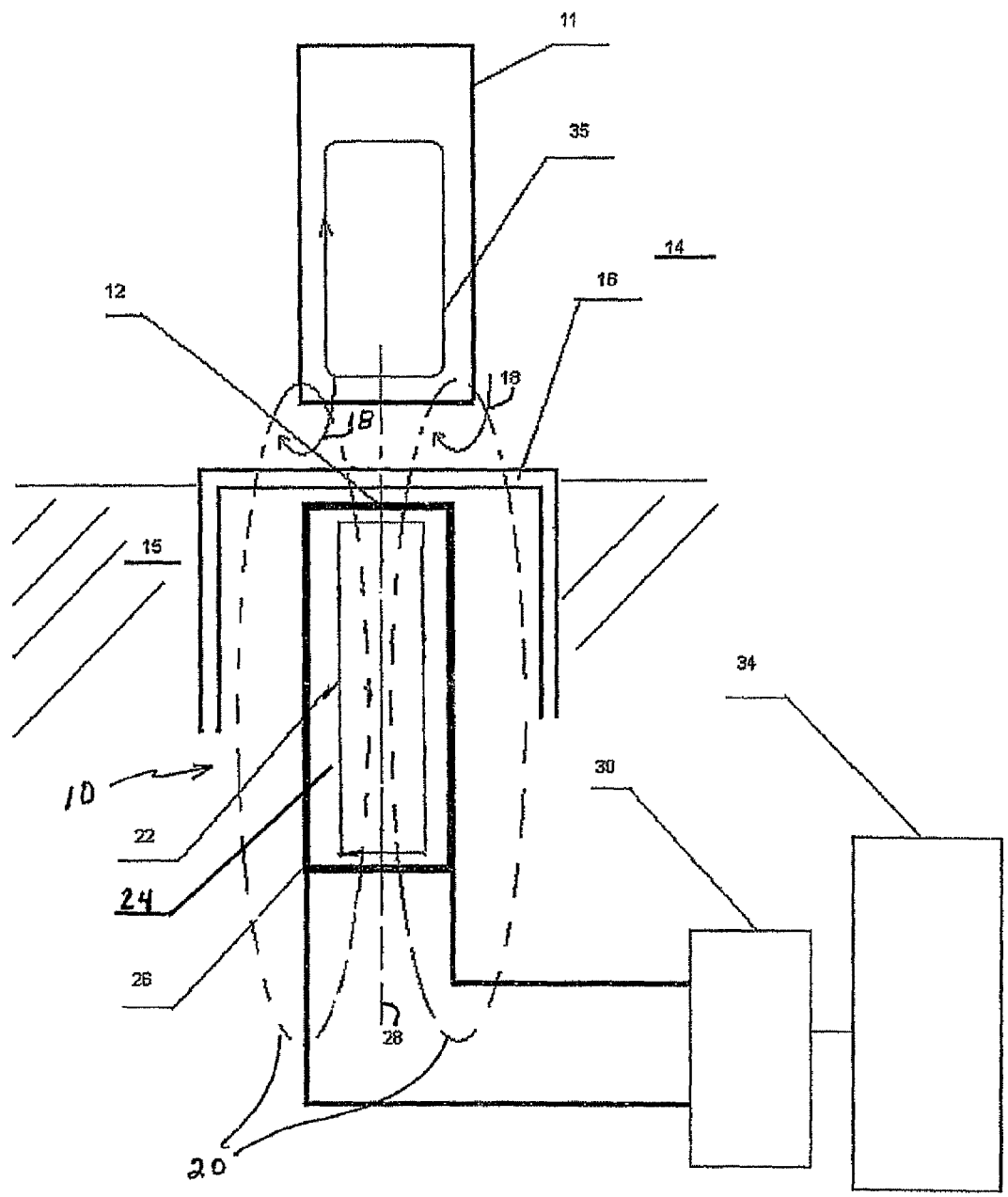

MEASURING VIBRATIONS OF A TURBO-MACHINE ROTOR BLADE WITH THE HELP OF AN INDUCTION SENSOR IN HIGH TEMPERATURE

CROSS REFERENCE TO RELATED APPLICATION

The present application of and claims priority of Polish patent application Serial No. P-385627, filed Jun. 9, 2008, and is hereby filed on even date herewith with U.S. application titled "Induction Sensor to Measure Vibrations of a Turbo-Machine Rotor Blade" claiming priority from Polish patent application Serial No. P-385979, filed Jun. 23, 2008, both of which are hereby incorporated by reference in their entirety.

BACKGROUND

This invention relates to measuring at high temperatures vibrations of a turbo-machine rotor blade with the help of an induction sensor. In the currently known method the induction sensor is placed in the engine housing in such a way that the face of the sensor is positioned in the blade's rotation plane. Then, with the help of a magnet, a magnetic field is generated in front of the sensor face. The measurement signal is generated in the sensor's coil as a result of the blade's movement in the magnetic field. The signal received is amplified with the help of an electronic system and is interpreted by a computer. However, such sensors have had performance problems due to the high temperature environment of a jet engine.

SUMMARY

A method is disclosed of measuring vibrations of turbo-machine rotary turbine blades with the help of an induction sensor in high temperatures, where the induction sensor is placed in the engine housing in such a way that its face is positioned in the turbine blade's rotational plane. A magnetic field is created in front of the sensor's face by a set of magnets and a measurement signal is generated in the sensor's coil as a result of the blade's movement in the magnetic field. The measurement signal is amplified with the help of an electronic system, then interpreted by a computer.

The face of the induction sensor is separated from the blade's working environment and from the engine housing by a ceramic screen and the sensor is then positioned in the turbine blade rotation plane. A stable and repeatable magnetic field is created in front of the sensor's face by a set of magnets with various magnetic field values and various Curie temperatures, with the phenomenon of temperature gradient in the ceramic screen between the inside of the engine and the elements taken advantage of.

BRIEF DESCRIPTION OF THE DRAWINGS

The FIGURE is a schematic view of the sensor and magnetic field.

DETAILED DESCRIPTION

The invention described herein solves the problem of measuring vibrations of turbo-machine rotary turbine blade 11 with the help of an induction sensor generally indicated at 10 at high temperatures. The face 12 of the induction sensor 10 is separated from the blade's 11 working environment 14 and from the engine housing 15 by a ceramic screen 16, and is then placed in the turbine blade's rotational plane as indicated by arrows 18. A stable and repeatable magnetic field 20 is created in front of the sensor's face 12 by a set of magnets 22, 24 with various magnetic field values and various Curie temperatures. The magnets 22 and 24 have a square cross section. They may also have a rectangular cross section. The phenomenon of temperature gradient in the ceramic screen 16 between the inside of the engine and the elements is used to protect the magnetic field.

The induction sensor coil 26 comprises a single winding (not divided into primary and/or secondary windings) around a lateral axis 28 of the magnets. The current inducted in shorted coil is being measured. The shorted coil ensures power (energy) interaction between the magnetic fields (of the blade 11 and sensor 10) being measured which creates a scalar electromagnetic moment (according to the Amper Right-Hand Rule) with its value depending on directions of the field vectors.

Eddy currents 35 are inducted in the blade by the permanent magnet's magnetic field 20. These eddy currents inducted in the blade are inducting current in the sensor's coil 26. Only the current inducted in the coil 26 is being measured. The output voltage of the sensor 10 is proportional to the magnetic induction of the permanent magnet, the cosine of angle between the blade's 11 surface and coil winding 26, and the movement velocity of the blade 11 before the sensor 10. The output voltage is inversely proportional to the radix of the resistivity of the material the blade is made of. The greater the electric conductivity of the blade 11 and lesser resistivity of the blade's material, the stronger is the output electric signal of the sensor 10.

The change of the sensor coil's winding refers to its transverse direction compared to the longitudinal winding in a known coil.

Bending of the blade comes first from its housing on the rotor's rim of blades. Second the bending comes from the rim vibration caused by a gas stream going past the blade in a working engine. The gas stream moves the blades, makes them bend and vibrate. The rim vibrates and changes its position regarding the primary construction setting. So the blade bending comes from both its construction and operational conditions. The direction of the coil winding is parallel to the longitudinal axis of the magnet but the working part of the winding is transverse to lines of the magnetic field forces.

The present method is used to measure the compressor's blade. This shortfall does not apply to the newly invented method in which the face of the induction sensor is separated from the blade's operating environment and from the engine housing by means of a ceramic screen. The sensor is placed in the turbine blade rotational plane shielded by the ceramic screen. A stable and repeatable magnetic field is created in front of the sensor's face by a set of magnets with various magnetic field values and various Curie temperatures. The phenomenon of temperature gradient in the ceramic screen between the inside of the engine and the elements is used.

A rotational plane is created by the blade in motion according to the rotational movement of the rim it is housed by. The sensor mentioned herein has different construction features of the magnet itself consisting of two pieces named in the application. The free end of the magnet having a higher Curie temperature and lower value of the magnetic field creates the face of the sensor, and its other end adheres to the magnet having a lower Curie temperature and higher value of the magnetic field. Thanks to sensor's ceramic housing, the second magnet from the sensor's face is secured against temperatures higher than its Curie temperature and is able to stabilize the electromagnetic field created by the first magnet. The Curie temperatures of both magnets are higher than the temperature of their surrounding environment. This arrangement of the magnets ensures an ability of creating a stable magnetic field at high temperatures.

The ceramic housing makes a shield isolating the sensor from the blade's operational environment and ensures desired temperature distribution in the sensor and thus the sensor is able to operate in a temperature reaching 800 Celsius degrees. In this application the sensor of this disclosure should be able to measure blade vibrations at high-temperatures.

The induction coil structure can be of any known structure. The temperature gradient in the ceramic screen protects both magnets from overheating by the operational environment of the blade as the outer surface of the ceramic housing is exposed to a temperature of 1200 Celsius degrees.

The ceramic screen also ensures electric insulation of the magnetic sensor's coil from the engine housing, which makes the system free from interference caused by the housing and the turbine's working environment. Thanks to the use of the ceramic screen and the set of magnets, it is possible to measure turbine blade vibrations in its actual working conditions characterized by very high operating temperatures reaching 800 degrees Centigrade.

The invention is illustrated by the following example of the method's application. The face of the induction sensor is equipped with a ceramic screen that separates it from the blade's working environment and from the engine housing. The sensor is then placed in the engine housing in such a way that its face is positioned in the turbine blade's rotation plane. A stable and repeatable magnetic field is created in front of the sensor's face by a set of magnets each with different magnetic field values and different Curie temperatures. The ceramic screen produces a temperature gradient between the inside of the engine and the elements of the sensor so that a stable and repeatable magnetic field is produced.

A measurement signal is generated in the sensor's coil as a result of the blade's movement in the magnetic field. Eddy currents 35 are induced in blade 11. The eddy currents 35 are sensed by the sensor 10. The signal is received by the sensor and is amplified with the help of an electronic system 30, and then interpreted by a computer 34.

Although the present invention has been described with reference to preferred embodiments, workers skilled in the art will recognize that changes may be made in form and detail without departing from the spirit and scope of the invention.

What is claimed is:

1. A method of measuring vibrations of turbo-machine rotary turbin blades using an induction sensor in a high temperature environment, the method comprising:
    placing the induction sensor which comprises a coil winding around a set of magnets in an engine housing such that a face of the induction sensor is positioned in the turbo-machine rotary turbine blade's rotation plane;
    producing a magnetic field in front of the sensor's face through the set of magnets;
    generating a measurement signal through the sensor's coil winding as a result of the turbo-machine rotary turbine blade's movement in the magnetic field;
    amplifying the signal and sending such signal to a computer; and
    wherein a substantially stable and substantially repeatable magnetic field is created in front of the sensor's face through the set of magnets, the magnets having different magnetic fields and different Curie temperatures, the Curie temperatures of the set of magnets being higher than the high temperature environment and the different between the Curie temperatures of at least two of the magnets being sufficiently different to effect a magnetic field sufficiently stable to induce eddy currents in the turbine blades.

2. The method of claim 1 wherein the face of the induction sensor is separated from the turbo-machine rotary turbine's blade's working environment and from the engine housing by a ceramic screen.

3. The method of claim 2 wherein a temperature gradient is created by the ceramic screen between the inside of the engine and the elements taken advantage of.

4. The method of claim 1 wherein the set of magnets includes first and second magnets, with the first magnet having a higher Curie temperature than the second magnet, and the first magnet having an end that comprises the face of the sensor.

* * * * *

UNITED STATES PATENT AND TRADEMARK OFFICE
CERTIFICATE OF CORRECTION

PATENT NO. : 8,125,215 B2  Page 1 of 1
APPLICATION NO. : 12/477472
DATED : February 28, 2012
INVENTOR(S) : Rokicki et al.

It is certified that error appears in the above-identified patent and that said Letters Patent is hereby corrected as shown below:

Claim 1:

Column 4, Line 7: "turbin" should be "turbine"
Column 4, Line 25: "different" should be "difference"

Signed and Sealed this
Twenty-ninth Day of May, 2012

David J. Kappos
*Director of the United States Patent and Trademark Office*